United States Patent [19]

Leonard

[11] 3,832,490

[45] Aug. 27, 1974

[54] CODER FOR INCREASE OF TRANSMISSION SPEED

[75] Inventor: Didier Leonard, Boulogne-sur-Seine, France

[73] Assignee: Compagnie Industrielle Des Communication Cit-Alcatel, Paris, France

[22] Filed: Oct. 13, 1972

[21] Appl. No.: 297,229

[52] U.S. Cl. ........... 178/68, 325/38 A, 340/347 DD

[51] Int. Cl. ........................................ H04l 3/00

[58] Field of Search........ 178/DIG. 3, 68; 325/38 R, 325/38 A; 340/347 D

[56] References Cited

UNITED STATES PATENTS

| | | | |
|---|---|---|---|
| 3,214,749 | 10/1965 | Karnaugh | 325/38 A |
| 3,571,725 | 5/1971 | Kaneko et al. | 325/38 A |
| 3,723,880 | 3/1973 | Van Gerwen | 325/38 A |

*Primary Examiner*—Benedict V. Safourek
*Attorney, Agent, or Firm*—Craig & Antonelli

[57] ABSTRACT

The invention concerns a device for transmitting binary values at a high speed in a channel having a limited bandwidth in the form of a signal having five levels. It is applied to transmission of asynchronous type.

6 Claims, 10 Drawing Figures

CODER FOR INCREASE OF TRANSMISSION SPEED

The invention comes within the technical field of binary signal transmission. It concerns a device enabling the transmission speed in a channel having a limited band width to be increased. It may be applied, more particularly to the facsimile transmission, but is not limited to that application.

It is known that the speed of data transmission is limited by the upper limit of the pass-band of the transmission channel. For example, in facsimile transmission, the forwarding of data contained in a document whose dimensions are 21 × 29.7 cm by means of the telephone network, hence on a channel having a band-width of 3,000 c/s, takes about 6½ minutes.

Among the attempts which have been made to transmit more data in the time unit on a channel having a given band-width, for example, more 1 and 0 values characterizing as many white and black dots, respectively, it has already been proposed that the 0 value be made to correspond to the color black (or white), and that once out of twice the +1 value, and the other time the −1 value be made to correspond to the color white (or black). Such a code, known as double binary code, enables the transmitting speed in a given channel to be doubled, at the expense of a slight loss in the signal-to-noise ratio.

The invention proposes to go further along this line, and affords means in the case of an asynchronous transmission for doubling once again the transmitting speed, that is, in all, to quadruple the transmitting speed in a channel having a given bandwidth.

The signal transmitted is then a signal having five levels; for example, in a total range of levels N subdivided by four thresholds +2, +1, −1, −2, with an inversion of values, black, white, black . . . alternately, each time the level N of the transmitted signal crosses one of the thresholds on rising or descending.

It will be shown that very simple means exist for bringing such a signal back to a conventional signal having two levels, 1, 0, hence having a maximum spectral frequency four times higher than the five-level signal.

According to an improvement, the invention also affords the means for compensating the effect of an excessive weakening of the peaks of the five-level signal produced by a transmitting channel having too narrow a pass-band. If $f1$ is the maximum frequency of the spectrum of the waveform of the binary signal before five-level coding, it becomes $f1/4$ after five-level coding, with the same data transmitting speed. But if the pass-band of the transmission channel is less than $f1/4$, the restoring of the amplitude of the waveform on receiving may be affected by a weakening such that the amplitude of the received wave does not reach the extreme thresholds, positive and negative respectively, which is $+3V/4$ in increasing values, or $-3V/4$ in decreasing values, designating as $\pm V$ the values of the peaks of the transmitted waves.

The result of this is that the coder according to the invention gives incorrect results if the weakening brought about by the transmission channel is greater than $V/4$ than the frequency $f1/4$.

This distortion is compensated on transmitting by systematically boosting the amplification of the levels which exceed the positive threshold $+V/4$ in increasing values, or the negative threshold −3/4 in decreasing values.

The invention will be described with reference to the accompanying drawings in which:

FIG. 1 comprises a graph and a table showing the conventional binary coding method;

FIG. 2 comprises a graph and a table showing the double binary coding method;

FIG. 3 comprises a graph and a table showing the coding method according to the invention;

Figure 1:
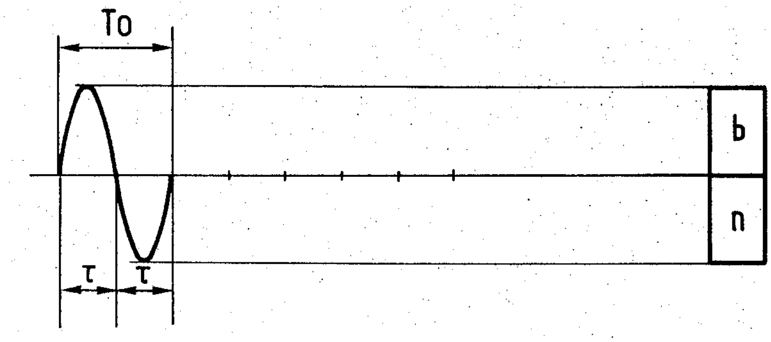

In FIG. 1 the graph (*a*) shows that, during a period $T_o$ of a signal having a frequency of $F_o = 1/T_o$, a white point and a black point corresponding respectively to a 1 value and to a 0 value of a binary signal may be transmitted. Each individual binary unit has a duration $\tau$.

The table (*b*) indicates the attribution of the luminosities $b$ = white $n$ = black depending on the levels of the signal (*a*).

Figure 2:
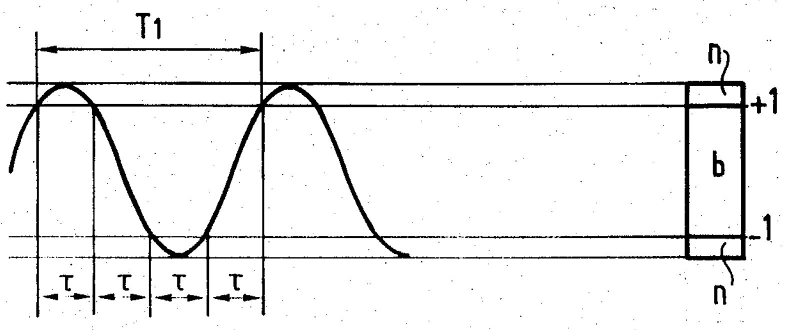

FIG. 2 corresponds to a coding by double binary signal which may assume three values defined by two thresholds +1, −1. The graph (*c*) shows that with such a coding for a same duration of the individual binary units, the period $T_1$ of the fundamental wave of the transmitted signal is doubled in relation to FIG. 1; the frequency is divided by two. During the period $T_1$, data concerning four points whose individual duration is $\tau$ may be transmitted: two blacks, two whites.

The table (*d*) shows the attribution of the luminosities $b$ and $n$ according to the levels of the signal (*c*).

Figure 3:
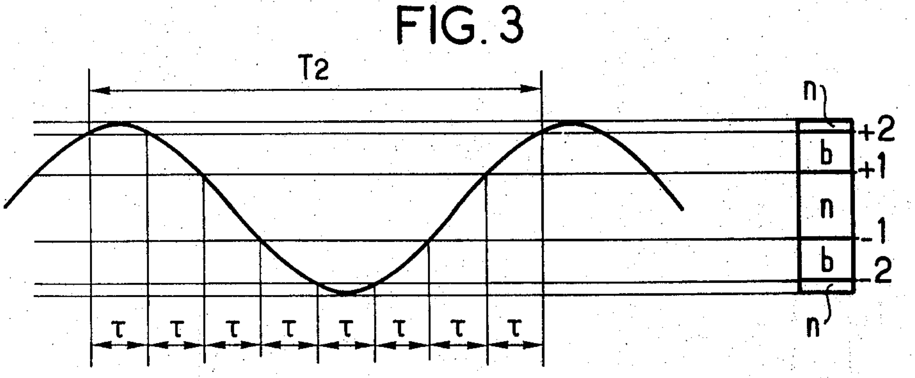

FIG. 3 corresponds to a coding according to the invention having five levels with the threshold values +2, +1, −1, −2. The graph (*a*) indicates that for a same duration of the individual binary unit, the fundamental period of the transmitted signal $T_2$ is the quadruple of $T_o$, therefore the fundamental frequency is divided by four. During a period $T_2$, eight point may be transmitted. The levels of one parity correspond to one luminosity, and the levels of the other parity correspond to the other luminosity.

The table (*f*) shows the attribution of the luminosities $b$ and $n$ according to the levels of the signal (3).

Figure 4:
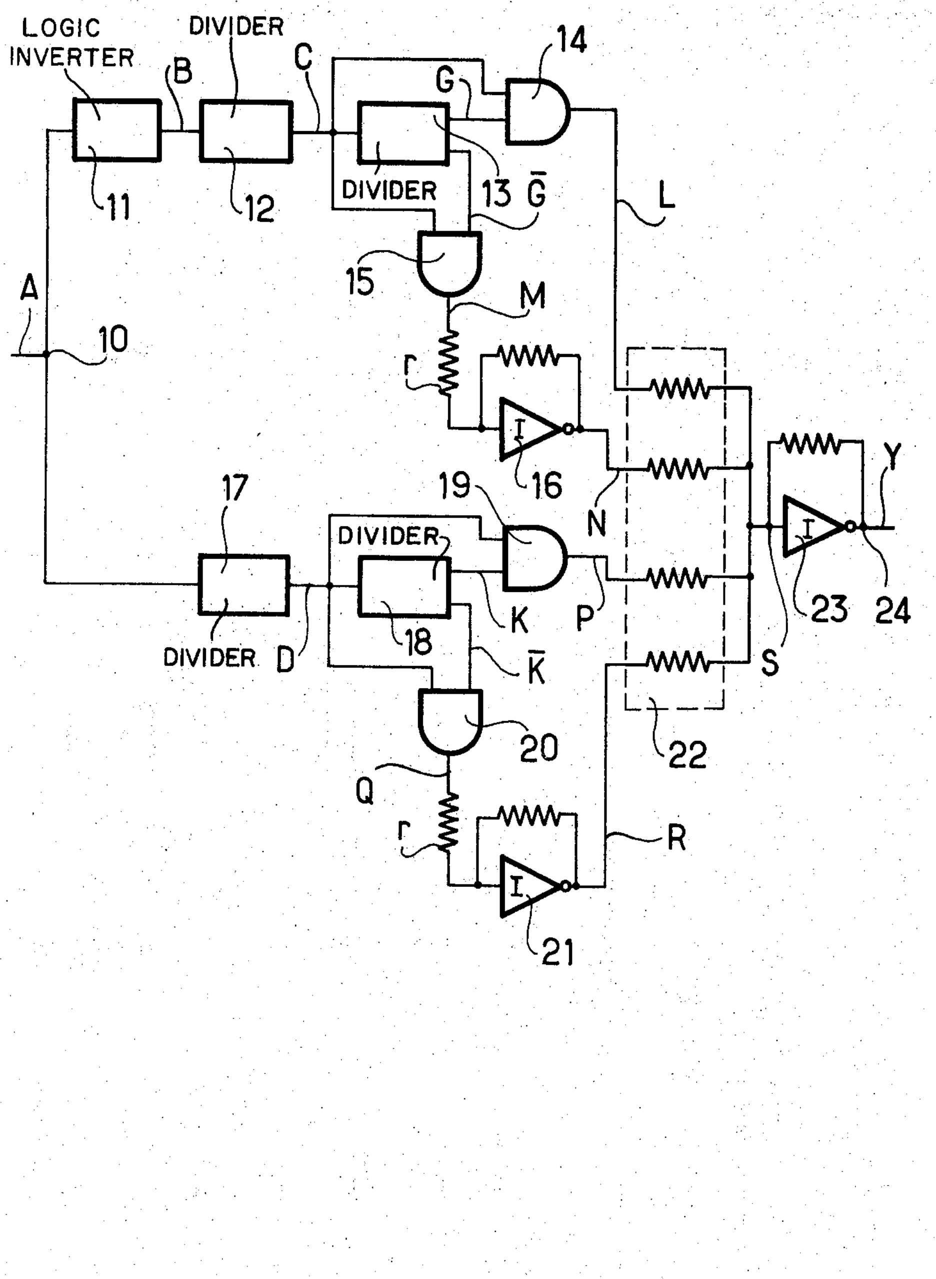
FIG. 4 is a diagram of an embodiment of a coder according to the invention.

FIG. 4 shows an example of a coder providing a coding having five levels according to the invention: An input terminal 10 receiving a binary signal A is common to two channels.

The first channel comprises, at the input, a logic inverter 11 followed by a pulse frequency divider 12. The inverter 11 provides a signal $B = \overline{A}$; the Divider 12 provides $C = B/2$.

The signal $C$ is applied to a pulse frequency divider 13, of which one output provides $G = C/2$, and the other output provides $\overline{G}$.

An AND gate 14, receiving C and G, provides, at the output, $L = CG$. Another AND gate, 14, receiving $C$ and $\overline{G}$, provides, at its output, $M = C\overline{G}$. The signal M is applied, through a preference resistor $r$, to an analog inverter amplifier 16, which provides a signal $N = -M$.

The second channel comprises, at the input, a pulse frequency divider 17 which provides a signal $D = A/2$.

The signal D is applied to a pulse frequency divider 18 of which one output provides $K = D/2$, and the other output provides $\overline{K}$.

An AND gate 19, receiving D and K, provides, at its output $P = DK$. Another AND gate 20, receiving $D$ and $\overline{K}$, provides $Q = D\overline{K}$.

The signal $Q$ is applied through a resistor $r$ of the same value as above to an analog inverter amplifier 21, which provides a signal $R = -Q$.

The signals L, N, P and R are applied, preferably through resistors 22, to an amplifier 23 having a high input impedance and much lower output impedance, which could possibly be of the same model as the amplifiers 16 and 21. The amplifier 23 receives a signal S $= L + N + P + R$, and provides, at an output terminal 24 the required signal Y.

Figure 5:
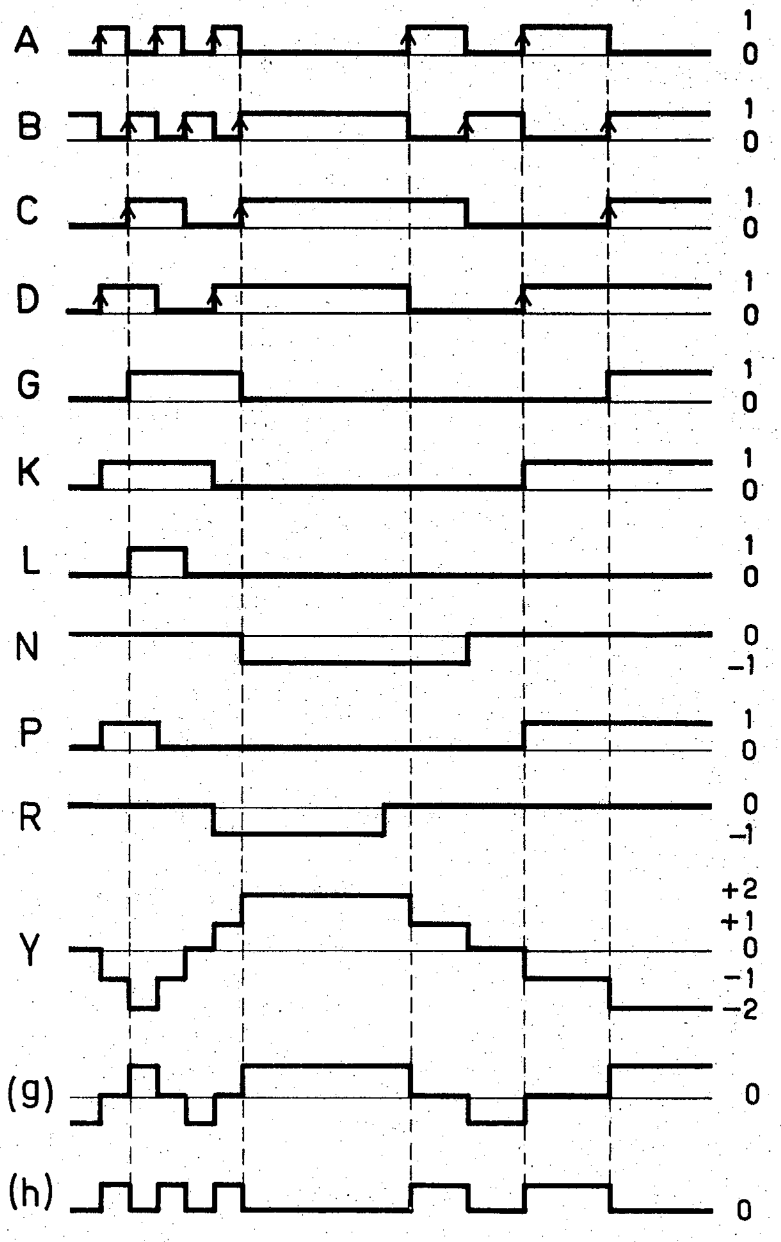
FIG. 5 is a set of graphs showing the signals at various points of the decoder according to FIG. 4 and of a converter (see FIG. 6)

FIG. 5 is a set of graphs showing the signals $A$, $B$, $C$, $D$, $G$, $K$, $L$, $N$, $P$, $R$, $Y$ and signals $g$ and $h$.

By way of example, a particular case of signal $A$ has been adopted, but the demonstration has an absolutely general scope.

The convention adopted is that the pulse frequency dividers change their state each time on a rising wave front of the signal they receive.

It will be seen that the input signal $A$ is transformed, at the output of the circuit according to the invention, into a signal $Y$ having five levels, +2, +1, 0, −1, −2.

In fact, the signal $Y$ has a quarter of the frequency of the signal $A$.

Figure 6:
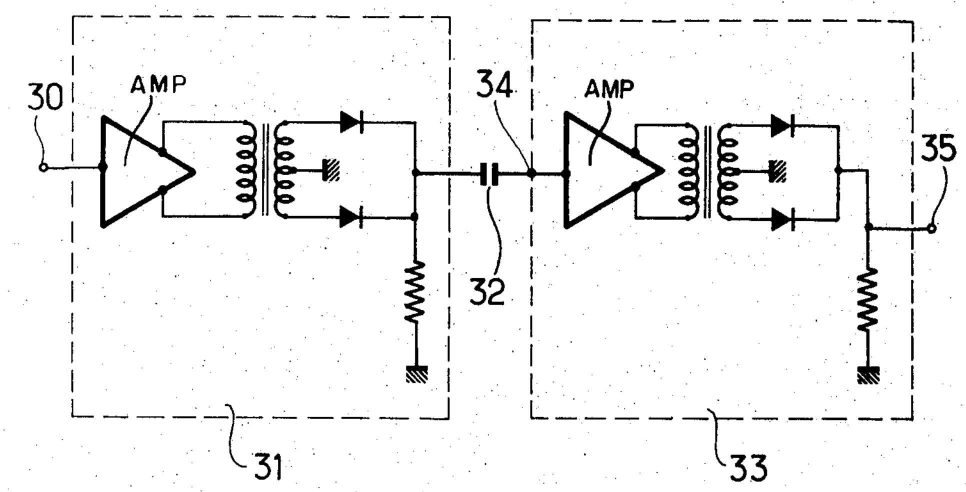
FIG. 6 is a diagram of a receiver-converter for a signal coded according to the invention.

The signals $g$ and $h$ are provided by the converter (FIG. 6).

In FIG. 6 the converter of the signal $Y$ according to the invention into a conventional binary signal is produced very simply by means of two cascaded full-wave rectifiers. The diagram of the converter comprises two full-wave rectifiers 31, 33, of known type, which it is unnecessary to describe in detail, interconnected by a capacitor 32. At the input terminal 30 of the element 31, the signal Y is applied, at the output terminal 35 of the element 33 of the input 34; the signal $A$ in FIG. 5 is again obtained, as shown by the graph $h$.

The capacitor 32 could be replaced by a transformer.

The graph ($g$) (FIG. 5) is the signal obtained at the input 34 of the element 33, after the first full-wave rectification in the element 31, FIG. 6.

The graph ($h$) (FIG. 5) is the signal obtained at the output terminal 35, after the second full-wave rectification in the element 33. This reconstituted signal is identical to the signal $A$.

Besides other operating advantages obtained from the reduction in the frequency to a quarter, the simplicity and the complete symmetry of the coder according to FIG. 4, which operates as an asynchronous unit, as well as the extreme simplicity of the converter according to FIG. 6 will be observed.

Figure 7:
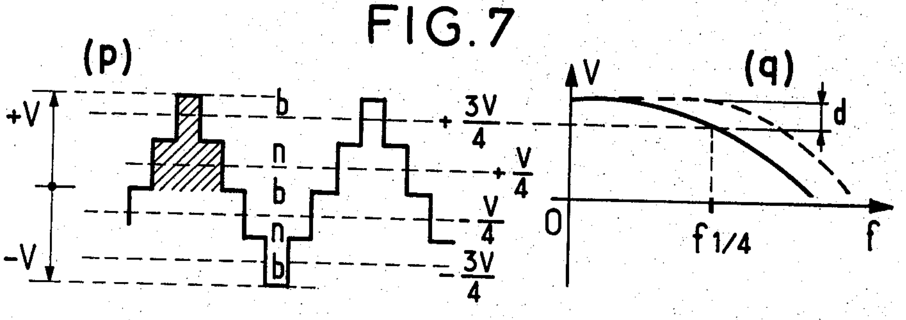
FIG. 7 is a graph which shows the effect of an undesirable weakening of the signal relative to the coded levels.

FIG. 7 contains a coding curve ($p$) between +V and $-V$, and four thresholds $-3V/4$, $-V/4$, $+V/4$, $+3V/4$. A weakened curve ($q$) without any correction in a continuous line, and a curve with a correction in a dotted line have been placed side by side.

The curve without correction shows that at the frequency $f_1/4$, the maximum positive level received will not be the level $+V$, but a level lower than $+3V/4$. Therefore, the threshold $3V/4$ will never be exceeded. The result is that an alternation assumed to be black-white-black will be decoded in continuous black (shade portion of the curve $p$).

If, by a suitable expedient, the level is raised to the frequency $f_1/4$ of a quantity equal to at least $d$ (curve in a discontinuous line), the effect of the weakening is corrected.

Figure 8:
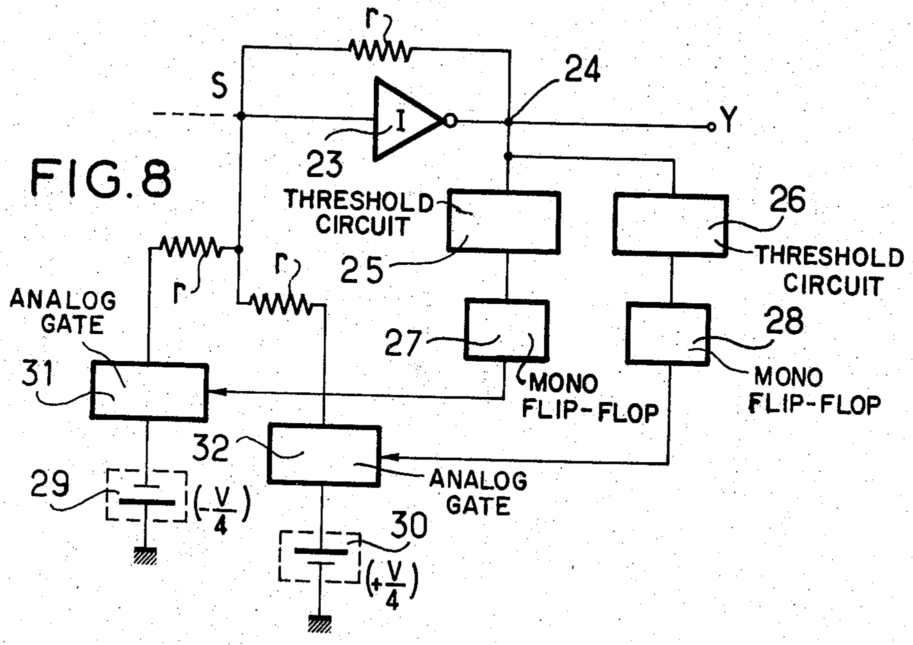
FIG. 8 shows a diagram of a device which, connected to the coder of FIG. 4 provides the required correction.

FIG. 8 shows a diagram of a correcting device applied to the input $S$ of the output amplifier 23 of the coder according to FIG. 4, which provides, at its output terminal 24, the coded signal $Y$.

The terminal 24 is connected to a first threshold 25 set at $-3V/4$, connected to a first monostable flip-flop 27, whose output may energize an analog, gate 31, which then applies a signal given by a direct current source 29, having a voltage preferably equal to $-V/4$, at the input S of the amplifier 23 through a resistor $r$, throughout the duration of the triggering of the monostable flip-flop 27.

The terminal 24 is also connected to a second branch comprising a second threshold 26 set at $+3V/4$, a second monostable flip-flop 28, an analog gate 32 and a direct current source 30, having a voltage equal to $+V/4$.

The duration of the triggering of the monostable flip-flops 27 and 28 is equal to $T = 1/2f1$ where $f1$ is the maximum rate of the binary signals before five-level coding.

Figure 9:
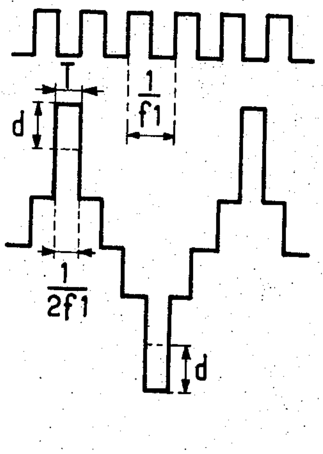
FIGS. 9 and 10 show graphs which indicate the effect of the correction according to the invention in two cases.
Figure 10:
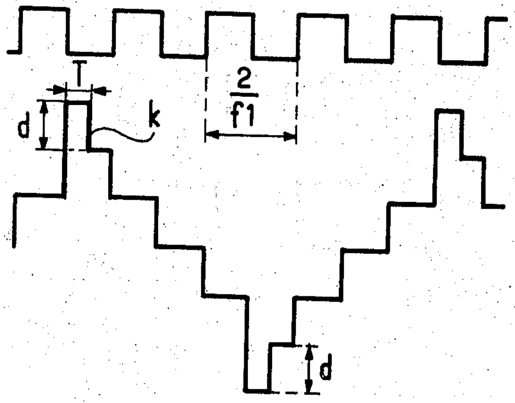

FIGS. 9 and 10 show the effect of the correction on the wave transmitted in two cases.

In FIG. 9, it has been assumed that the rate before coding (upper curve) was equal to $f1$. Each binary unit has a duration $T = 1/2f1$. The amplification of the crests of the wave, positive and negative, is boosted at least by the value $d$ throughout the duration of a time interval $T$. This boosted amplification, at least equal to the weakening $d$, does not bring about any disturbance on reception, the only criterion being the exceeding of the extreme thresholds, whatever the amplitude of exceeding may be.

In FIG. 10 it has been supposed that the rate before coding was equal to $f1/2$. The duration of the binary unit is here twice that in the case of FIG. 9, that is $1/f1$. Nevertheless, the duration of the triggering of the monostable flip-flops 27 and 28 (FIG. 8) remains the same, $T = 1/2f1$. The result of this is a fall in value $k$ in the shape of the peak of the coding curve, which causes, on reception, a slight distortion in the position, far less serious than a complete alteration of the levels which would be obtained without compensation.

What is claimed is:

1. A coder having five levels enabling the maximum frequency to be transmitted to be divided by four in relation to a given input binary signal, comprising, first and second channels having their inputs connected together to receive said input binary signal, said first channel including first and second two input coincidence gates, a first pulse frequency divider whose output is connected to one input of each of said first and second two input coincidence gates and a second pulse frequency divider having its input connected to the output of said first pulse frequency divided and having two complementary output terminals connected respectively to the other inputs of said first and second two input coincidence gates, said first coincidence gate having its output connected to an inverter, said second channel being identical to the said first channel and additionally comprising an additional inverter connected to the input of the first pulse frequency divider, and a summing amplifier having four inputs respectively connected to the outputs of said second coincidence gates and said inverters of said first and second channels.

2. A coder according to claim 1, further including means for compensating the weakening in the line, comprising first and second circuits each of which contains a threshold element connected to the output of the summing amplifier, a monostable flip-flop connected to said threshold element, an analog gate and a direct current source connected in series to the input of said summing amplifier; one circuit having a negative threshold and a negative source, the other circuit having a positive threshold and a positive source, said flip-flops in each circuit being connected to an analog gate in their respective circuit.

3. A coder according to claim 2, characterized in that the duration of the triggering of the said monostable flip-flops is equal to $1/2f1$ where $f1$ is the maximum frequency of the binary signals processed by the coder.

4. A coder having five levels enabling the maximum frequency to be transmitted to be divided by four in relation to a given input binary signal, comprising first and second pulse frequency dividers connected in series to an input terminal, said second pulse frequency divider providing complementary outputs, a first AND gate having one input connected to the output of said first divider and a second input connected to one of the complementary outputs of said second divider, a second AND gate having one input connected to the output of said first divider and a second output connected to the other complementary output of said second divider, a first inverting amplifier connected to the output of said second AND gate, an inverter connected to said input terminal, third and fourth pulse frequency dividers connected in series to the output of said inverter, said fourth pulse frequency divider providing complementary outputs, a third AND gate having one input connected to the output of said third divider and a second input connected to one of the complementary outputs of said fourth divider, a fourth AND gate having one input connected to the output of said third divider and a second input connected to the other complementary output of said fourth divider, a second inverting amplifier connected to the output of said fourth AND gate, a summing amplifier, and impedance means connecting the outputs of said first and third AND gates and said first and second inverting amplifiers to the input of said summing amplifier.

5. A coder according to claim 4, further including means for compensating the weakening in the line, comprising first and second circuits each of which contains a threshold element connected to the output of the summing amplifier, a monostable flip-flop connected to said threshold element, an analog gate and a direct current source connected in series to the input of said summing amplifier; one circuit having a negative threshold and a negative source, the other circuit having a positive threshold and a positive source, said flip-flops in each circuit being connected to analog gate in their respective circuit.

6. A coder according to claim 5, characterized in that the duration of the triggering of the said monostable flip-flops is equal to $1/2f1$ where $f1$ is the maximum frequency of the binary signals processed by the coder.

* * * * *

UNITED STATES PATENT OFFICE
CERTIFICATE OF CORRECTION

Patent No. 3,832,490 Dated August 27, 1974

Inventor(s) Didier Leonard

It is certified that error appears in the above-identified patent and that said Letters Patent are hereby corrected as shown below:

Title page, insert the following:

[30] Foreign Application Priority Date

October 13, 1971 France........ EN 71 36 797

Title page as it reads now:

[73] Assignee: Compagnie Industrielle Des Communication Cit-Alcatel, Paris, France Title page as it should read:

[73] Assignee: Compagnie Industrielle Des Telecommunications Cit-Alcatel Paris, France Signed and sealed this 17th day of December 1974.

(SEAL)
Attest:

McCOY M. GIBSON JR.
Attesting Officer

C. MARSHALL DANN
Commissioner of Patents